United States Patent
Doades et al.

[11] 3,982,930
[45] Sept. 28, 1976

[54] METHOD FOR DISPOSAL OF TRACER BULLETS

[75] Inventors: William E. Doades, Otwell; James E. Short, Jr., Switz City; Karen S. Whorrall, Shoals, all of Ind.

[73] Assignee: The United States of America as represented by the Secretary of the Navy, Washington, D.C.

[22] Filed: Sept. 25, 1975

[21] Appl. No.: 616,698

[52] U.S. Cl. .............................. 75/101 R; 75/121; 423/155; 423/395
[51] Int. Cl.$^2$ ........................................ C22B 26/22
[58] Field of Search........... 75/101 R, 121; 423/155, 423/395

[56] References Cited
UNITED STATES PATENTS
3,930,844  1/1976  Parrish et al...................... 75/101 R Primary Examiner—G. Ozaki
Attorney, Agent, or Firm—R. S. Sciascia; Paul S. Collignon

[57] ABSTRACT

A method for disposing of tracer bullets having in a steel bullet a pyrotechnic material containing strontium nitrate, magnesium, strontium peroxide, polyvinyl chloride, calcium resinate, barium peroxide, oxamide, zinc stearate, polyethylene, strontium oxalate and lead dioxide, with strontium nitrate and magnesium accounting for about sixty percent of the total material. The pyrotechnic material is removed from the steel bullet by drilling and the steel is used as scrap. Strontium nitrate is first removed from the material by dissolving in cold water, and the water solution of strontium nitrate is evaporated to reclaim the strontium nitrate. The remaining materials are given successive washes in hot water, isopropyl alcohol and methylene chloride to remove all the other materials except magnesium. The magnesium is dried and reclaimed.

4 Claims, 1 Drawing Figure

METHOD FOR DISPOSAL OF TRACER BULLETS

CROSS-REFERENCE TO RELATED APPLICATION

Patent application of Clyde F. Parrish et al, entitled, "Method For Disposal Of Pyrotechnic Waste", Ser. No. 547,535, filed Feb. 6, 1975, now U.S. Pat. No. 3,930,844.

BACKGROUND OF THE INVENTION

The present invention relates to a method for disposing of tracer bullets.

Tracer bullets are normally comprised of a steel, conical-shaped jacket having a cavity which contains a pyrotechnic composition. Most tracer compositions are made from varying percentages of the same basic materials and these are, in order of quantity, strontium nitrate, magnesium, strontium peroxide, polyvinyl chloride, calcium resinate, barium peroxide, oxamide, zinc stearate, polyethylene, strontium oxalate, and lead dioxide. The strontium nitrate and magnesium account for about 60 percent of the total. The heretofore known method of disposing of tracer bullets consisted in burning the bullets in metal containers at a burning ground. This method, however, puts degraded pyrotechnic material into the air and is ecologically unsound and not desirable.

SUMMARY OF THE INVENTION

The present invention relates to a method for disposing of tracer bullets having a pyrotechnic composition which is about forty percent strontium nitrate and about twenty-four percent magnesium. The remaining materials are strontium peroxide, polyvinyl chloride, calcium resinate, barium peroxide, oxamide, zinc stearate, polyethylene, strontium oxalate and lead dioxide. The particular materials and percentages used depend on the caliber of the ammunition and also on the particular depot which is manufacturing the ammunition. The pyrotechnic material is removed from the steel bullet by drilling and the steel bullet is sufficiently clean so that it can go directly to the scrap pile without any additional processing. The pyrotechnic material is collected and strontium nitrate is first removed from the pyrotechnic composition by immersing the composition in water sufficiently cold so that it will only dissolve strontium nitrate. The water solution is then filtered and evaporated to reclaim the strontium nitrate. The remaining ingredients are given successive washes in hot water, in isopropyl alcohol and methylene chloride. The solution is decanted after each wash and the remaining material is magnesium, which is then dried and reclaimed for subsequent use as a pyrotechnic material.

It is therefore a general object of the present invention to provide an improved method for disposing of tracer bullets without creating air pollution.

Other objects, advantages and novel features of the present invention will become apparent from the following detailed description of the invention when considered in conjunction with the accompanying drawing.

DESCRIPTION OF THE PREFERRED METHOD

Figure 1:
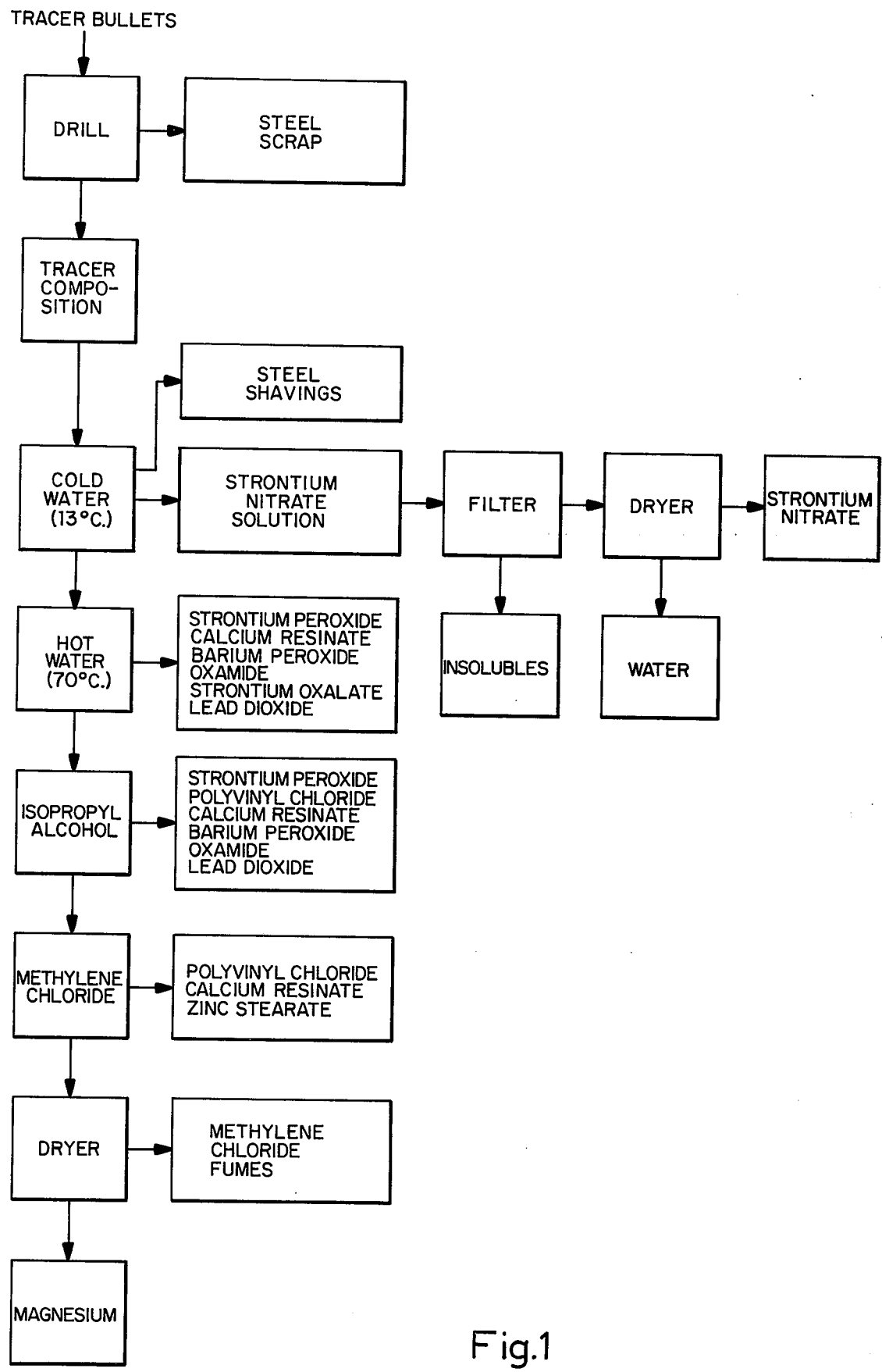
FIG. 1 is a flow-diagram showing the steps of the present invention.

The first step required in the present method is that of removing the pyrotechnic material from the steel bullet. The pyrotechnic material is drilled from the bullet and in a preferred method the drill bit is mounted in a stationary position. A tracer bullet is inserted into a drill chuck and rotated and then lowered while turning onto the drill bit. The composition falls down and is collected in a tray.

Most tracer bullets contain varying percentages of the same basic materials with strontium nitrate and magnesium accounting for about 60 percent of the total composition. In the present method, strontium nitrate and magnesium are reclaimed for use in other pyrotechnic compositions and thus the amount of pyrotechnic waste which is to be disposed is less than half. Additionally, the residual is primarily inert materials and is less hazardous than the original compositions.

Although specific materials and percentages vary for different types and sizes of tracer bullets, the present method is designed so that all tracer compositions can be mixed together and be processed by a single method. This procedure is not only more economical, but prevents errors that could occur if a multiple number of processes were employed. The following examples show various compositions for tracer ammunition currently being manufactured by the military departments:

| M62 Ammunition (7.62mm) | |
|---|---|
| Strontium Nitrate | 41.9% |
| Magnesium | 23.1% |
| Strontium Dioxide | 19.8% |
| Polyvinyl Chloride | 12.9% |
| Calcium Resinate | 2.3% |

| M196 Ammunition (5.56mm) | |
|---|---|
| Strontium Nitrate | 37.4% |
| Magnesium | 26.0% |
| Strontium Dioxide | 21.1% |
| Polyvinyl Chloride | 11.5% |
| Calcium Resinate | 1.8% |
| Barium Peroxide | 1.1% |
| Lead Dioxide | 1.1% |

| M25 Ammunition (.30 Cal.) | |
|---|---|
| Strontium Nitrate | 41.9% |
| Magnesium | 22.6% |
| Strontium Dioxide | 20.3% |
| Polyvinyl Chloride | 12.9% |
| Calcium Resinate | 2.3% |

| M48 Ammunition (.50 Cal.) | |
|---|---|
| Strontium Nitrate | 32.4% |
| Magnesium | 23.9% |
| Strontium Dioxide | 8.6% |
| Polyvinyl Chloride | 6.9% |
| Calcium Resinate | 2.8% |
| Barium Peroxide | 23.5% |
| Strontium Oxalate | 1.6% |
| Zinc Stearate | 0.3% |

| M17 Ammunition (.50 Cal.) | |
|---|---|
| Strontium Nitrate | 41.8% |
| Magnesium | 25.7% |
| Strontium Dioxide | 5.9% |
| Polyvinyl Chloride | 10.6% |
| Calcium Resinate | 1.9% |
| Barium Peroxide | 12.9% |
| Strontium Oxalate | 1.1% |
| Zinc Stearate | 0.1% |

| M242 Ammunition (20mm) | |
|---|---|
| Strontium Nitrate | 34.5% |
| Magnesium | 19.8% |
| Strontium Dioxide | 22.1% |
| Polyvinyl Chloride | 12.6% |
| Calcium Resinate | 4.3% |
| Oxamide | 6.7% |

| M220 Ammunition (20mm) | |
| --- | --- |
| Strontium Nitrate | 35.5% |
| Magnesium | 20.5% |
| Strontium Dioxide | 29.7% |
| Polyvinyl Chloride | 11.0% |
| Calcium Resinate | 3.3% |

The present invention is illustrated by the following example:

EXAMPLE

Five hundred 7.62mm tracer bullets were drilled and the pyrotechnic material collected. A No. 1 twist drill (0.228 inch) was mounted in a stationary position and each tracer bullet was inserted into a chuck and lowered turning onto the twist drill. The composition fell down and was collected in a tray. The composition is washed with cold water (13° C.) and the mixture was agitated with a magnetic stirrer to dissolve the strontium nitrate. Any shavings from the steel bullets are attracted to the magnetic stirrer and are easily removed. The mixture was allowed to settle and the liquid decanted and filtered. The solution was dried and 71.3 grams of strontium nitrate were recovered from the 500 rounds of tracer bullets.

The insoluble residue was next washed with hot water and, after the solids were allowed to settle, the liquid was decanted. The optimum temperature for the hot water was about 70° C. Temperature greater than 70° C. gave some fizzing as the magnesium oxidized and released hydrogen. Temperatures lower than 70° C. resulted in magnesium that was visually less pure. Strontium peroxide, calcium resinate, barium peroxide, oxamide, strontium oxalate and lead dioxide are dissolved by hot water and those that are dissolved are decanted off with the hot water.

The remaining ingredients are then washed with isopropyl alcohol followed by wash with methylene chloride. As shown in the drawing, the wash with isopropyl alcohol removes strontium peroxide, polyvinyl chloride, calcium resinate, barium peroxide, oxamide, and lead dioxide. The wash with methylene chloride removes polyvinyl chloride, calcium resinate and zinc stearate. Both the methylene chloride and the isopropyl alcohol are saved for reuse or reclamation.

The remaining ingredient, magnesium, was dried and 59.3 grams of magnesium were recovered from the 500 rounds of tracer bullets. The magnesium and strontium nitrate that was recovered was loaded into new tracer rounds and performed satisfactorily when fired.

The present method of removing the tracer composition from the steel bullet by drilling and then treating the composition with water, isopropyl alcohol and methylene chloride has two significant advantages over burning. Magnesium and strontium nitrate are recovered for reuse in pyrotechnic compositions and also the tracer composition is not transformed into an atmospheric pollutant.

Obviously many modifications and variations of the present invention are possible in the light of the above teachings. It is therefore to be understood that within the scope of the appended claims the invention may be practiced otherwise than as specifically described.

We claim:

1. A method for disposing of tracer bullets having a steel casing filled with pyrotechnic material containing strontium nitrate, magnesium, strontium peroxide, polyvinyl chloride, calcium resinate and other pyrotechnic materials, with the combined percentages of strontium nitrate and magnesium comprising at least sixty percent of the total percentage of said pyrotechnic material, comprising the steps of first rotating said steel casing filled with pyrotechnic material against a stationarily mounted twist drill whereby said pyrotechnic material is drilled from said steel casing and falls onto a collecting tray, then immersing the collected pyrotechnic material in water sufficiently cold to dissolve only strontium nitrate, then decanting the water solution of strontium nitrate and evaporating the water to reclaim strontium nitrate, then removing all materials of said tracer ammunition pyrotechnic material other than magnesium by successive washes of hot water and solvents, and then drying the remaining magnesium for reuse as a pyrotechnic material.

2. A method for disposing of tracer bullets as set forth in claim 1 wherein said pyrotechnic material is immersed in water having a temperature of about 13° C. to dissolve only strontium nitrate.

3. A method for disposing of tracer bullets as set forth in claim 2 wherein said pyrotechnic material and cold water are agitated by a magnetic stirrer whereby any steel shavings resulting from drilling are attracted to said magnetic stirrer.

4. A method for disposing of tracer bullets as set forth in claim 1 wherein said successive washes are a water wash with water having a temperature of about 70° C., followed next by a wash with isopropyl alcohol and then by a wash with methylene chloride.

* * * * *